United States Patent

Markowski et al.

[11] Patent Number: 5,983,667
[45] Date of Patent: Nov. 16, 1999

[54] CRYOGENIC SYSTEM FOR PRODUCING ULTRA-HIGH PURITY NITROGEN

[75] Inventors: Mary Louise Markowski, Lewiston; Thomas John Bergman, Jr., Clarence Center; James Philip Natwora, Jr., Eden; John Keller Howell, Tonawanda; David Richard Thompson, Grand Island, all of N.Y.

[73] Assignee: Praxair Technology, Inc., Danbury, Conn.

[21] Appl. No.: 08/962,545

[22] Filed: Oct. 31, 1997

[51] Int. Cl.⁶ ........................................................ F25J 1/00
[52] U.S. Cl. .................................. 62/648; 62/908; 62/909
[58] Field of Search ................................ 62/648, 908, 909

[56] References Cited

U.S. PATENT DOCUMENTS

| | | |
|---|---|---|
| 3,722,226 | 3/1973 | McDermott et al. .................... 62/908 |
| 4,617,040 | 10/1986 | Yoshino ........................................ 62/37 |
| 4,713,224 | 12/1987 | Tamhankar et al. ..................... 423/219 |
| 4,902,321 | 2/1990 | Cheung ........................................ 62/24 |
| 5,098,457 | 3/1992 | Cheung et al. ............................. 62/24 |
| 5,122,175 | 6/1992 | Koyama et al. ............................. 62/38 |

FOREIGN PATENT DOCUMENTS 590946  6/1994  European Pat. Off. .

Primary Examiner—Ronald Capossela
Attorney, Agent, or Firm—Stanley Ktorides

[57] ABSTRACT

A process for further purification of nitrogen gas, thereby producing ultra-high purity nitrogen which is substantially free of hydrogen, oxygen and carbon monoxide, wherein the nitrogen gas is contacted with a metal-containing adsorbent at a temperature of 150 K. or less.

10 Claims, 3 Drawing Sheets

CRYOGENIC SYSTEM FOR PRODUCING ULTRA-HIGH PURITY NITROGEN

FIELD OF THE INVENTION

This invention relates generally to the production of ultra-high purity nitrogen and, more particularly, to the production of ultra-high purity nitrogen using a process operating at a cryogenic temperature.

BACKGROUND ART

Consumers of nitrogen in the electronics industry typically require ultra-high purity nitrogen which contains less than 1 part-per-billion (ppb) of any contaminant such as oxygen, hydrogen and carbon monoxide. Concentrations of these substances in nitrogen obtained from a conventional cryogenic air separation plant are typically in the range of about 0.5–2 parts-per-million (ppm). Oxygen, which has a higher boiling point than nitrogen, is almost completely removed by the cryogenic distillation. However, since the boiling point of carbon monoxide is very close to that of nitrogen, and that of hydrogen is much lower, most of the carbon monoxide present in the feed air to the cryogenic air separation plant is also present in the nitrogen product stream from the plant, and the hydrogen concentration in the nitrogen product stream is about double that in the feed air.

Removal of these contaminants is typically carried out using a conventional adsorption process following the cryogenic air separation process. However, such a system is disadvantageous because of the large size of the adsorption vessels needed to carry out the purification.

An alternative to the use of conventional ambient temperature adsorption processes for producing ultra-high purity nitrogen is the upstream oxidation of hydrogen and carbon monoxide to water and carbon dioxide, respectively. These oxidation products are then removed in a molecular sieve prepurification system prior to the cryogenic air separation. This oxidation is typically carried out as a catalytic process. A major disadvantage of this oxidation process is that it requires high temperatures, increasing the energy requirements, and hence the cost of the entire process. Another disadvantage is that the oxygen remaining in the product nitrogen stream must be removed by another means, usually a separate cryogenic distillation process, which adds further to the cost of the overall process.

Accordingly, it is an object of this invention to provide an improved system for producing ultra-high purity nitrogen.

SUMMARY OF THE INVENTION

The above and other objects, which will become apparent to one skilled in the art upon a reading of this disclosure, are attained by the present invention which is:

A cryogenic adsorption process for producing ultra-high purity nitrogen, said process comprising contacting nitrogen gas containing one or more of hydrogen, oxygen or carbon monoxide impurities with a metal-containing adsorbent at a temperature of 150 K. or less, and producing ultra-high purity nitrogen which is substantially free of hydrogen, oxygen and carbon monoxide.

As used herein the terms "cryogenic adsorption" and "cryoadsorption" mean an adsorption process carried out at a temperature of 150 K. or less.

As used herein, the term "column" means a distillation or fractionation column or zone, i.e., a contacting column or zone wherein liquid and vapor phases are countercurrently contacted to effect separation of a fluid mixture, as for example, by contacting or the vapor and liquid phases on a series of vertically spaced trays or plates mounted within the column and/or on packing elements which may be structured packing and/or random packing elements. For a further discussion of distillation columns see the Chemical Engineers' Handbook fifth edition, edited by R. J. Perry and C. H. Chilton, McGraw-Hill Book Company, New York, Section 13, *The Continuous Distillation Process*. A column may include a top condenser wherein vapor is condensed for column reflux.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns. Cryogenic rectification is a rectification process carried out, at least in part, at temperatures at or below 150 degrees Kelvin (K.).

As used herein, the term "indirect heat exchange" means the bringing of two fluids into heat exchange relation without any physical contact or intermixing of the fluids with each other.

As used herein, the terms "upper portion" and "lower portion" of a column mean those portions respectively above and below the midpoint of the column.

As used herein, the term "top" of a column means that section of the column above the internals, e.g. trays or packing, of the column.

DETAILED DESCRIPTION

In the method of this invention, nitrogen gas, which contains one or more of hydrogen, oxygen or carbon monoxide impurities at the ppm level, is contacted with an adsorbent at a temperature of 150 K. or less. Preferably, the temperature is no greater than about 120 K., and most preferably the temperature is in a range from 80–100 K. The adsorbent adsorbs substantially all of hydrogen, oxygen or carbon monoxide which may be present in the nitrogen gas, resulting in an ultra-high purity nitrogen product which is substantially free of hydrogen, oxygen and carbon monoxide. Carrying out the adsorption process at a cryogenic temperature allows nitrogen gas produced in a cryogenic air separation system to be withdrawn from the separation system and directly purified without undergoing a heating step prior to the adsorption step, thus reducing operating costs. Nitrogen that is being held in a storage tank may also be purified with the method of this invention. In this embodiment, nitrogen from a cryogenic storage tank is contacted with the adsorbent at or near the storage temperature without preheating. The cryoadsorption system of this invention also enables the use of much smaller adsorption vessels than those necessary with conventional higher temperature or ambient temperature systems thus reducing the capital costs of the purification system.

Suitable adsorbents for the method of this invention which are capable of efficiently adsorbing hydrogen, carbon monoxide and oxygen at cryogenic temperatures are shown in Table 1 and include adsorbents that contain nickel, copper, palladium, or iron. The preferred adsorbents are nickel-containing adsorbents, and the most preferred adsorbent is nickel(II) oxide on an alumina support. Preferably, the adsorbent is contained in the form of an adsorbent bed in a vessel of suitable capacity for the required quantity of adsorbent.

In a preferred embodiment of this invention, adsorbents are regenerated by heating in an atmosphere of hydrogen and ultra-high purity nitrogen at a temperature greater than 120° C., preferably greater than 200° C. The most preferred composition of the atmosphere used for regeneration of the adsorbent is about 1% hydrogen, by volume of the total mixture, in ultra-high purity nitrogen. The hydrogen reacts with the carbon monoxide and oxygen on the surface of the adsorbent to form methane and water, respectively. The methane and water are more weakly bound to the adsorbent and thus can be removed easily from the surface of the adsorbent by the nitrogen stream. Regeneration is performed at varying intervals depending on the capacity of the adsorbent vessels and the concentrations of hydrogen, carbon monoxide and/or oxygen in the nitrogen used as a feed for the process. Typically, multiple vessels are employed to allow regeneration of one or more vessels while one or more vessels are in use for producing ultra-high purity nitrogen.

Figure 1:
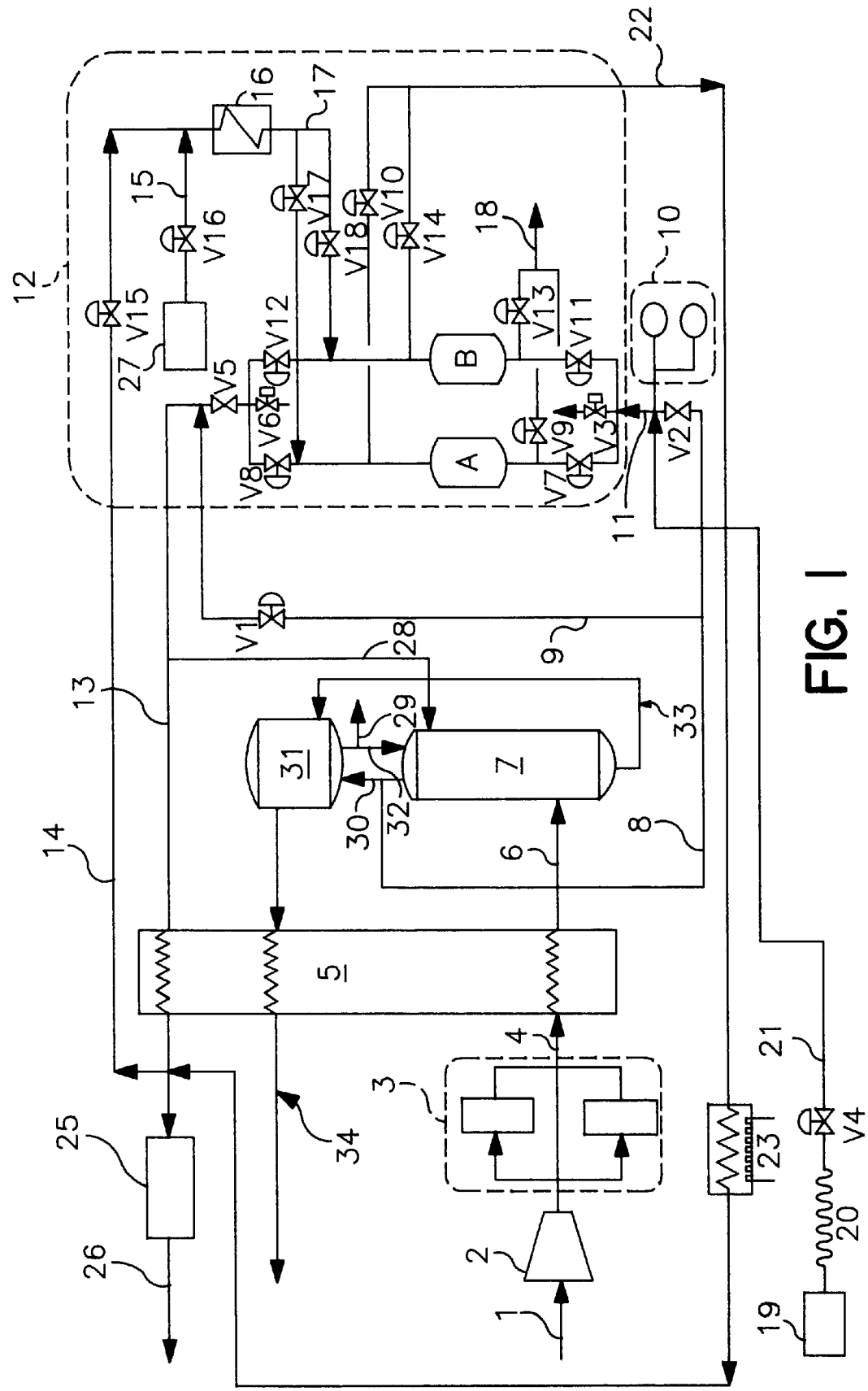
FIG. 1 is a schematic process flow diagram of a preferred embodiment of the invention in which the cryoadsorption process is integrated with a cryogenic air separation plant.

FIG. 1 is a process flow diagram showing the cryoadsorption nitrogen purification system of this invention integrated with a cryogenic air separation plant. Referring to FIG. 1, feed air in piping 1 is compressed in compressor 2 and carbon dioxide, water and some hydrocarbons are removed by prepurifier 3. Hydrogen and carbon monoxide, which may be in the feed air, are not removed by the prepurifier because they are not adsorbed by the molecular sieve materials of the prepurifier at the compressor discharge conditions. The cleaned air stream in piping 4 is then cooled to cryogenic temperatures by indirect heat exchange in a heat exchanger 5 against return streams. The cooled air stream in piping 6 is fed into a cryogenic rectification column 7, wherein the feed air is separated by cryogenic rectification into nitrogen gas and oxygen-enriched liquid. The nitrogen gas has a relatively low concentration of oxygen, typically less than 1 ppm. The distillation process shown is meant to represent a generic distillation process that produces nitrogen having a low level of oxygen. The distillation process, per se, does not affect purifier design and configuration. Therefore, any process which removes oxygen to low levels for the production of nitrogen may be used in conjunction with this invention. In a process that does not produce nitrogen at cryogenic temperatures, the product stream is cooled before carrying out the process of this invention. Ultra-high purity nitrogen can be added back into the top of the distillation column to improve distillation efficiency, and thereby decrease the oxygen content in the nitrogen gas produced by the column.

Cryogenic nitrogen gas leaves the distillation process through piping 8, bypass piping 9 and bypass valve V1 to the cryogenic purifier 12, or to oxygen analyzers 10 where its oxygen content is measured prior to entering the cryogenic purifier to prevent high-oxygen excursions. Another portion 30 of the nitrogen gas is passed into top condenser 31 wherein it is condensed and returned to column 7 as reflux stream 32. Oxygen-enriched liquid is passed from the lower portion of column 7 in stream 33 into top condenser 31 wherein it is vaporized by indirect heat exchange with the aforesaid condensing nitrogen gas and from when it is removed from the system in waste stream 34.

The cryogenic purifier 12 is shown in FIG. 1. A summary of the valves (V1–V18) follows:

| | |
|---|---|
| V1 | Control valve for bypass 9. |
| V2 | Back-up liquid piping 21. |
| V3 | Vent valve for piping 11. |
| V4 | Valve for back up piping 21. |
| V5 | Valve for purified nitrogen product exiting purifier. |
| V6 | Purge valve for piping 9 or 13. |
| V7 | Isolation valve to Bed 12A used to isolate from product stream for regeneration cycle. |
| VB | Isolation valve to Bed 12A used to isolate from product stream for regeneration cycle. |
| V9 | Regeneration vent for Bed 12A. |
| V10 | Product valve from Bed 12A for piping 22. |
| V11 | Isolation valve to Bed 12B used to isolate from product stream for regeneration cycle. |
| V12 | Isolation valve to Bed 12B used to isolate from product stream for regeneration cycle. |
| V13 | Regeneration vent for Bed 12B. |
| V14 | Product valve from Bed 12B for piping 22. |
| V15 | Valve for regeneration cycle to allow purifier product flow 14. |
| V16 | Valve for regeneration cycle to allow pure hydrogen to blend with product flow 15. |
| V17 | Valve for regeneration of Bed 12A. |
| V18 | Valve for regeneration of Bed 12B. |

Two oxygen analyzers are used for redundancy. The nitrogen vapor stream passes through piping 11 and enters the cryogenic purifier 12 where hydrogen, carbon monoxide and any remaining oxygen are removed to be at a concentration of about 1 ppb or less. Valve V3 is a vent valve for piping 11. The purified product stream leaving the purifier in piping 13 is warmed to ambient temperature in heat exchanger 5, then recovered. Valve V6 is a purge valve for piping 9 or 13.

The purifier 12 of this invention comprises two beds, 12A and 12B, that contain a metal-containing adsorbent, e.g. at least 5% nickel balanced alumina adsorbent material, preferably 10–30% nickel balanced alumina adsorbent material, and most preferably, 20% nickel balanced alumina adsorbent material. The purified product comes from either Bed 12A or Bed 12B. There are a pair of isolation valves on each purifier bed to isolate it from the streams carried in piping 11 or 21 for regeneration or a possible shut-down. Isolation valves V7 and V8 are used on 12A; and valves V11 and V12 on 12B. One bed 12A is regenerating while the other bed 12B is adsorbing.

Regeneration is accomplished by mixing about 5% of ultra-high purity nitrogen product from piping 14 and valve V15 with hydrogen from tank 27, passing through valve V16 and piping 15 to make a mixture containing about 1 volume percent hydrogen which is heated in heater 16 to a temperature of no less than 120° C., and preferably at least 200° C. Typically the bed to be regenerated is heated to at least 120° C. prior to introducing the 1% hydrogen blend. The hot stream passes through piping 17 and valve V17 to purifier bed 12A, or valve V18 for 12B, heating the respective adsorbent bed and releasing any adsorbed substances. The spent regeneration stream is vented through valve V9 and piping 18 from 12A, or through valve V13 and piping 18 from 12B.

The regeneration process requires no less than 120° C., preferably at least 200° C. and hydrogen to react with the adsorbed carbon monoxide to form methane, and to react with oxygen to form water. The methane and water along with the hydrogen are then easily desorbed. The regeneration cycle is 24 hours, at which time the beds are switched to replace the adsorbing bed with a regenerated bed. Regeneration can be done every 24 hours or every few days, depending on the vessel capacity. Regeneration flow is countercurrent to the adsorption flow.

The cryogenic purification system of this invention may also be used to remove 0.5–1 ppm oxygen and 1–2 ppm carbon monoxide from nitrogen stored and transported in liquid form. Nitrogen is typically stored in liquid form to meet usage needs when the cryogenic rectification plant is not in service. Stored backup liquid in tank 19 is heated to ambient temperature using a vaporizer 20, passing through valve V4, piping 21 and valve V2 to the cryogenic purifier. Stored liquid product typically contains little hydrogen because hydrogen boils off in transport and in the liquid storage tank. Carbon monoxide loading, which is identical at either ambient or cryogenic temperatures, dictates vessel size in the cryogenic adsorber. Therefore, the cryogenic purifier size may be used for either process or liquid nitrogen purification.

Because the purifier is at a cryogenic temperature when process nitrogen is passing through it, backup nitrogen leaving the purifier from bed 12A or bed 12B is initially cold. If it is required to warm the product nitrogen, it is passed through valve V10, or valve V14, respectively, and piping 22 to an electric heat glycol/water bath 23. The warmed stream passes through piping 24 to the filter skid 25. The streams passing through either piping 13 or 24 are treated in a filter skid assembly 25 to remove fine particles before the product stream exits through piping 26 for recovery.

In addition, at the same mass flow rate, the volume of vaporized liquid nitrogen that would pass through the purifier would be greater than the volume of cryogenic nitrogen passing through the regenerator during normal operation. Pressure loss through the purifier when vaporized liquid is purified is about four times that observed with process vapor. However, the pressure available in the liquid storage tank is typically relatively high. Therefore, this increased pressure drop will not cause problems.

FIG. 1 illustrates a particularly preferred embodiment of this invention wherein a portion of the ultra-high purity nitrogen produced by the cryoadsorption system is returned to upper portion, preferably to the top, of the cryogenic rectification column 7 in piping 28. This reflux operation improves the efficiency of the air separation system and lowers the oxygen content of the nitrogen gas produced by the cryogenic rectification column. The ultra-high purity nitrogen passes into the top condenser for the production of reflux. If desired, condensed nitrogen gas from top condenser 31 may be removed in piping 29 and recovered as ultra-high purity liquid nitrogen.

Table 1 contains data from laboratory characterization work done on identified cryoadsorption materials at 87° K. (–183° C.). The criterion for selecting a cryoadsorbent material is that the material adsorb the maximum number of moles of carbon monoxide, oxygen and hydrogen per mole of metal in the cryoadsorbent. The best cryoadsorbing material identified from the laboratory work was the Crosfield nickel catalyst HTC-500™ (available from Crosfield Catalysts, Chicago, Ill.).

TABLE 1

| SOURCE/ADSORBENT | COMPOSITION | H/M | CO/M | O/M | Comments |
| --- | --- | --- | --- | --- | --- |
| METADYNE (Elma, NY) | Tungsten Sponge | — | <0.01 | — | >700° C. to regenerate |
| Union Carbide (Danbury, CT) | 9% CuO-Y Zeolite | — | 0.23 | — | |
| Crosfield/HTC-500 ™ | 20% NiO/$Al_2O_3$ | 0.01 | 0.09 | 0.02 | |
| BASF (Mt. Olive, NJ)/R-3-12 ™ | CuO/ZnO/$Al_2O_3$ | — | <0.01 | — | Loading based on 40% $Cu^+$ |
| Union Carbide/OC-112 ™ | 50% CuO; $MnO_2$/$SiO_2$ | — | <0.01 | <0.01 | |
| Carus (Ottawa, IL)/Carulite-300 ™ | 75% $MnO_2$; 15% CuO/$Al_2O_3$ | — | <0.01 | <0.01 | Loading based on 75% $Mn^{+3}$ |
| Degussa (Tulsa, OK)/E-221 ™ | 0.5% Pd/$Al_2O_3$ | — | 1.1 | — | |
| United Catalyst (Louisville, KY)/C12-4-02 ™ | Fe/$Al_2O_3$ | — | <0.01 | 0.01 | $O_2$ loading based on 80% $Fe^{+2}$ |
| Engelhard (Iselin, NJ)/CR-0211 T 5/32" ™ | 18% $Cr_2O_3$/$Al_2O_3$ | — | <0.01 | <0.01 | |
| Engelhard/Silica 2351 T 1/8" ™ | 90% Silica/$Al_2O_3$ | — | — | <0.01 | |
| Engelhard/Co-0138 E 1/16" ™ | 30% Co/Silica | — | 0.02 | <0.01 | |
| Various | 5A Mol. Sieves | — | 0.04 | — | |

In Table 1, H/M, CO/M, O/M are mole to mole ratios of atomic hydrogen, carbon monoxide and oxygen respectively to the given metal.

Figure 2:
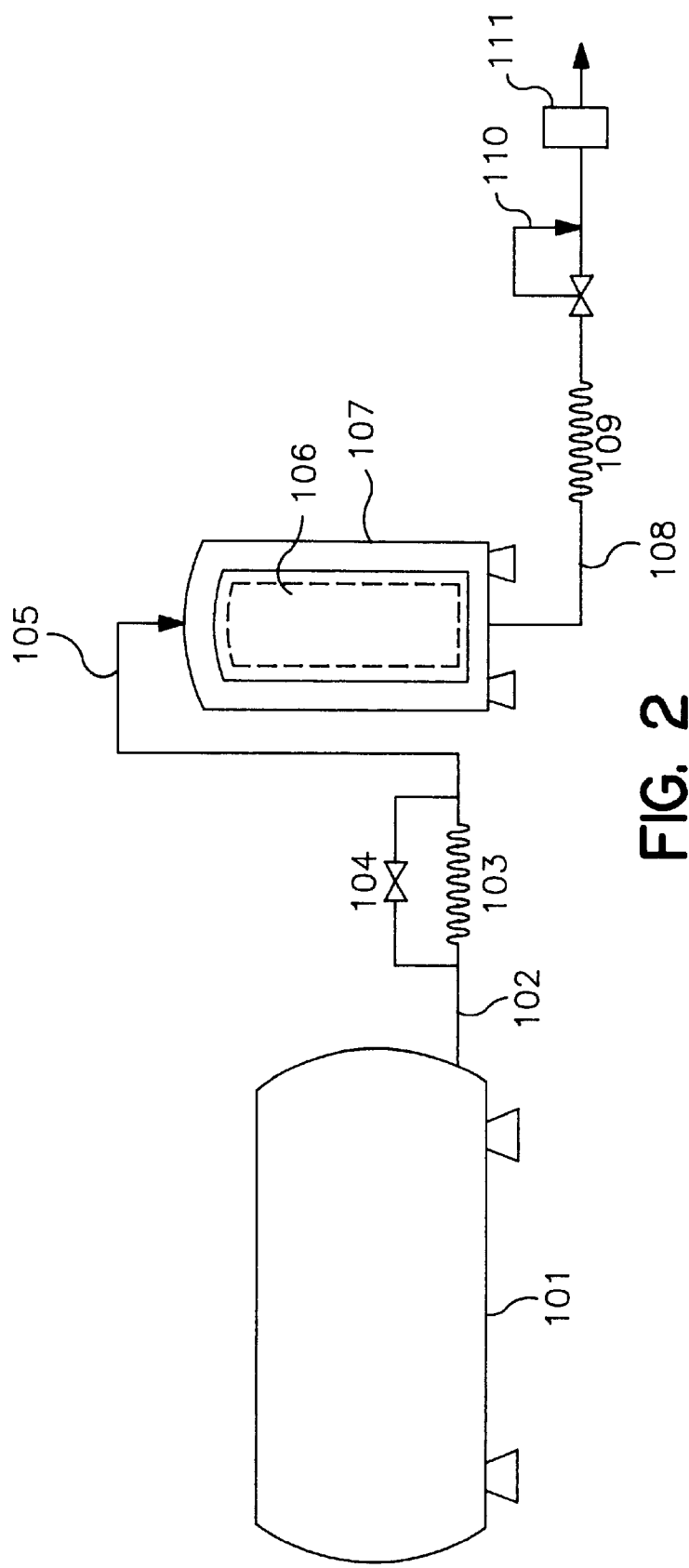
FIG. 2 is a process flow diagram of another preferred embodiment of the invention in which the cryoadsorption process is employed to purify nitrogen drawn from a storage tank.

In another preferred embodiment of this invention, a stand-alone cryoadsorption system is employed to produce ultra-high purity nitrogen from standard grade nitrogen such as from a liquid nitrogen storage tank or a liquid trailer. A process flow diagram is shown in FIG. 2. The cryoadsorption system of this invention is used to purify nitrogen gas containing one or more of oxygen, hydrogen or carbon monoxide at levels of 0.1–10 ppm to levels of 1 ppb or less by cryogenic gas phase chemiadsorption.

As shown in the process flow diagram in FIG. 2, liquid nitrogen is withdrawn from tank 101, flows through piping 102 and passes through a vaporizer 103, or through valve 104 bypassing the vaporizer. The vaporized nitrogen is maintained in either case at a temperature of 150 K. or less, preferably from 80–100 K., and most preferably at about 90 K. The nitrogen flow in piping 105 is either at full product flow as a gas or, as a liquid, at about 1–10 gallons per hour to the top of the catalyst bed where it flash vaporizes. The flash vaporization maintains the cryogenic refrigeration of the catalyst bed when not in use. The cryogenic high purity nitrogen vapor flows through the catalyst bed 106 where at least one of the impurities (oxygen, hydrogen, and carbon monoxide) is chemiadsorbed to 1 ppb or less. The vessel 107 that contains the catalyst bed has only an inlet and outlet port for flow and/or catalyst handling. The vessel employs cryogenic insulation to maintain the cryogenic temperature. It is vertically supported. The ultrahigh purity nitrogen vapor remains at cryogenic temperature, and exits from the bottom outlet of the bed through piping 108. The ultra-high purity nitrogen is warmed to ambient temperature in vaporizer 109, its pressure is regulated by pressure regulator 110, and it passes through a particulate filter skid 111 to eliminate any particulate matter before being recovered.

The preferred nickel catalyst bed has the capacity to purify cryogenic nitrogen vapor for 30 days without the need to regenerate. The bed preferably is large enough to purify nitrogen from a liquid nitrogen storage tank or a liquid trailer for 30 days, and to allow for a less frequent regeneration interval, e.g., 6–12 months. For example, for a plant that will produce 180,000 cubic feet per hour (CFH) nitrogen, the required amount of catalyst is at least 500 pounds, but no greater than 5,000 pounds.

Figure 3:
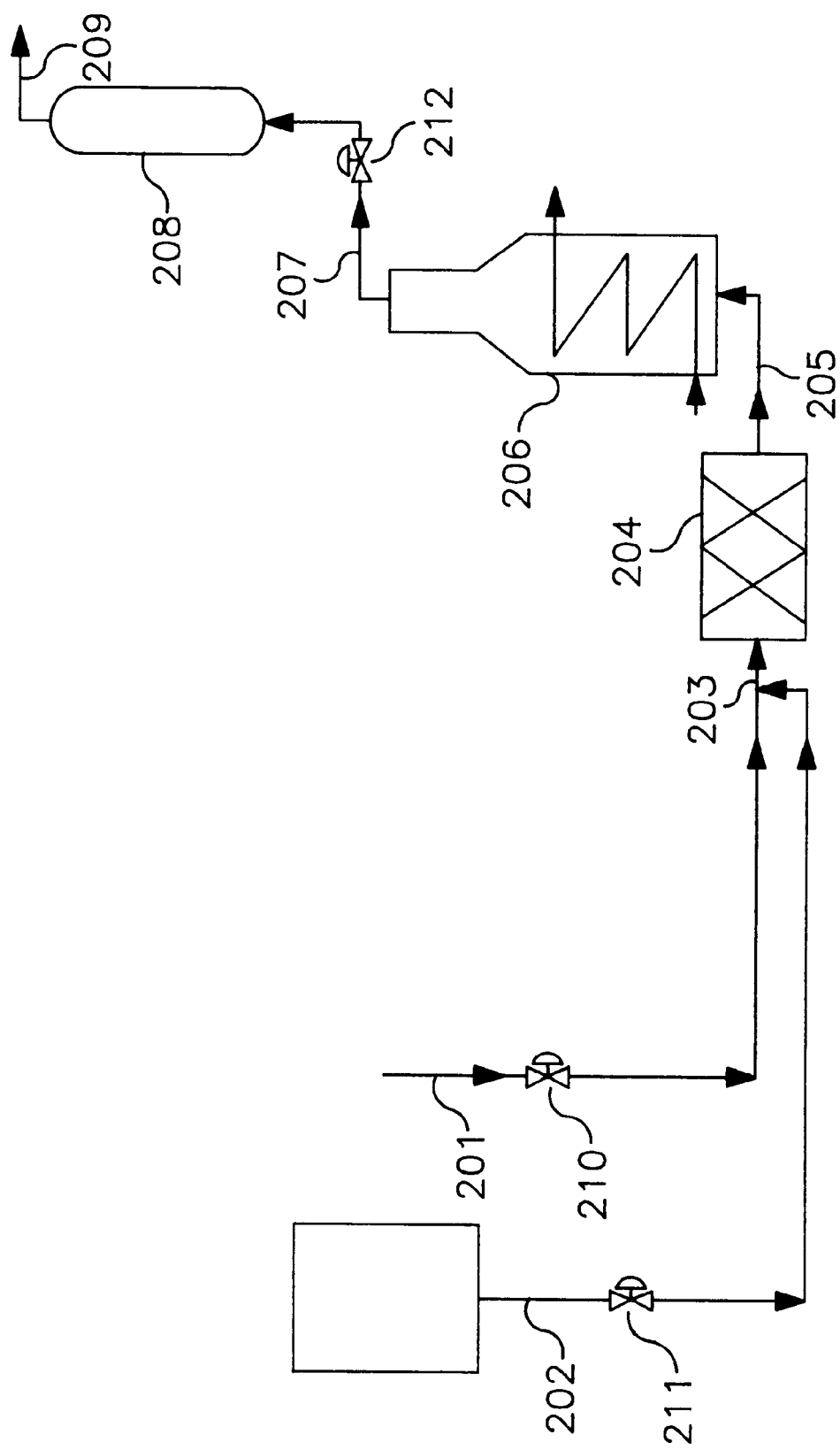
FIG. 3 is a process flow diagram of a system for regenerating adsorbent in the embodiment illustrated in FIG. 2.

The cryopurifier shown in FIG. 2 does not have permanent regeneration capability. Regeneration is done using auxiliary equipment on or off-site to regenerate the catalyst. The required equipment and setup is illustrated in FIG. 3. Regeneration is accomplished by mixing about 5% of the ultra-high purity nitrogen product stream, passing through piping 201 and valve 210 near ambient temperature, with a hydrogen supply stream passing through piping 202 and valve 211 to make a regeneration stream in piping 203 comprising nitrogen and about 1 volume percent hydrogen. The regeneration stream enters a static mixer 204 to ensure good mixing. A mixer is not absolutely necessary to carry out the process successfully. The regeneration stream then passes through piping 205 and enters a heater 206, where it is heated to not less than 120° C., preferably at least 200° C. As the heated stream exits the heater through piping 207 it passes through a shut off valve 212 and enters the catalyst adsorbent bed 208. The adsorbent bed is heated by the stream and releases any adsorbed substances. The spent regeneration stream is vented through the bed and piping 209 to exhaust.

The regeneration process requires a temperature of at least 120° C., preferably at least 200° C., and a gas stream containing hydrogen to reduce the adsorbed carbon monoxide to methane, and to reduce oxygen to form water. The methane and water, along with the hydrogen mixture stream, are then easily desorbed. The regeneration cycle, including heating and cooling sequences, can be from 24 hours up to 2 weeks, depending on the vessel capacity. Regeneration flow is countercurrent to the adsorption flow.

Although the invention has been described in detail with reference to certain preferred embodiments, those skilled in the art will recognize that there are other embodiments of the invention within the spirit and the scope of the claims.

What is claimed is:

1. A cryogenic chemiadsorption process for producing ultra-high purity nitrogen, said process comprising contacting nitrogen gas containing one or more of hydrogen, oxygen or carbon monoxide impurities with a metal-containing adsorbent containing at least one of nickel, copper, palladium and iron, at a temperature of 150 K. or less, and producing ultra-high purity nitrogen which is substantially free of hydrogen, oxygen and carbon monoxide.

2. The process of claim 1, wherein the adsorbent contains nickel.

3. The process of claim 2, wherein the adsorbent is nickel(II) oxide mechanically supported on a substrate comprising alumina.

4. The process of claim 1, further comprising regenerating the adsorbent at a temperature no less than about 120° C.

5. The process of claim 4, wherein the adsorbent is regenerated in contact with a mixture of hydrogen and ultra-high purity nitrogen.

6. The process of claim 1, wherein the nitrogen gas is drawn from a cryogenic rectification column.

7. The process of claim 1, wherein the nitrogen gas is drawn from a liquid nitrogen storage tank.

8. A cryogenic chemiadsorption process for producing ultra-high purity nitrogen, said process comprising contacting nitrogen gas containing one or more of hydrogen, oxygen or carbon monoxide impurities with a metal-containing adsorbent containing at least one of nickel, copper, palladium and iron, at a temperature of 150 K. or less, and producing ultra-high purity nitrogen which is substantially free of hydrogen, oxygen and carbon monoxide, wherein the nitrogen gas is drawn from a cryogenic rectification column and wherein a portion of the ultra high purity nitrogen is introduced into the upper portion of the cryogenic rectification column.

9. The process of claim 8, further comprising recovering liquid ultra-high purity nitrogen from the cryogenic rectification column.

10. A cryogenic chemiadsorption process for producing ultra-high purity nitrogen, said process comprising contacting nitrogen gas containing one or more of hydrogen, oxygen or carbon monoxide impurities with a metal-containing adsorbent containing at least one of nickel, copper, palladium and iron, at a temperature of 150 K. or less, and producing ultra-high purity nitrogen which is substantially free of hydrogen, oxygen and carbon monoxide, wherein the nitrogen gas is drawn from a liquid nitrogen storage tank and is flash vaporized prior to the contact with the adsorbent.

* * * * *